(12) United States Patent  (10) Patent No.: US 8,264,599 B2
Liu  (45) Date of Patent: Sep. 11, 2012

(54) LAPTOP WITH PIVOTAL CAMERA AND MICRO-PROJECTOR AND SCREEN AS A REPLACEMENT OF DISPLAY

(75) Inventor: Yung-Lung Liu, Taichung Hsien (TW)

(73) Assignee: Sunrex Technology Corp., Taichung (TW)

( * ) Notice: Subject to any disclaimer, the term of this patent is extended or adjusted under 35 U.S.C. 154(b) by 157 days.

(21) Appl. No.: 12/781,132

(22) Filed: May 17, 2010

(65) Prior Publication Data

US 2011/0279688 A1  Nov. 17, 2011

(51) Int. Cl.
*H04N 5/225* (2006.01)
*H04N 5/222* (2006.01)

(52) U.S. Cl. ............... 348/374; 348/333.1; 361/679.02

(58) Field of Classification Search ........... 348/373–374
See application file for complete search history.

(56) References Cited

U.S. PATENT DOCUMENTS

| 5,218,389 | A | * | 6/1993 | Harlon et al. | 353/122 |
| 5,521,660 | A | * | 5/1996 | Hodson et al. | 353/122 |
| 6,198,624 | B1 | * | 3/2001 | Margaritis | 361/679.05 |
| 6,597,410 | B1 | * | 7/2003 | Doany et al. | 348/744 |
| 6,806,850 | B2 | * | 10/2004 | Chen | 345/7 |
| 7,156,351 | B2 | * | 1/2007 | Wang et al. | 248/121 |
| 7,677,737 | B2 | * | 3/2010 | Lonn | 353/69 |
| 7,712,903 | B2 | * | 5/2010 | Shingu | 353/122 |
| 2002/0180726 | A1 | * | 12/2002 | Shi et al. | 345/418 |
| 2005/0128695 | A1 | * | 6/2005 | Han | 361/683 |
| 2005/0132536 | A1 | * | 6/2005 | Hashizume | 16/386 |
| 2006/0291020 | A1 | * | 12/2006 | Knox et al. | 359/15 |
| 2008/0136973 | A1 | * | 6/2008 | Park | 348/744 |
| 2009/0322967 | A1 | * | 12/2009 | Liou et al. | 348/744 |
| 2011/0279687 | A1 | * | 11/2011 | Liu | 348/207.1 |
| 2011/0286170 | A1 | * | 11/2011 | Liu | 361/679.4 |

* cited by examiner

*Primary Examiner* — Hung Lam

(57) ABSTRACT

A laptop includes a housing; a keyboard mounted on the housing; a rectangular frame element pivotably secured to a front end of the housing and being adapted to open or close onto the keyboard; a screen enclosed by the frame element; an inverted U-shaped frame member pivotably secured to front corners of the housing and being adapted to open or close onto the frame element; a micro-projector pivotably mounted on a transverse part of the frame member; and a camera pivotably mounted on the transverse part of the frame member besides the micro-projector.

1 Claim, 6 Drawing Sheets

LAPTOP WITH PIVOTAL CAMERA AND MICRO-PROJECTOR AND SCREEN AS A REPLACEMENT OF DISPLAY

BACKGROUND OF THE INVENTION

1. Field of Invention

The invention relates to laptops and more particularly to a laptop with pivotal camera and micro-projector, and a pivotal screen as a replacement of display.

2. Description of Related Art

Projector and laptop are often required in a meeting or briefing nowadays. A type of laptop having a pivotal micro-projector is commercially available. The micro-projector is pivotal and mounted on a top edge of a display of the laptop. It has the benefits of being used as a typical projector if such need arises in a meeting or briefing.

However, it is not stable in use when the laptop is placed on a desktop. Moreover, the micro-projector consumes energy greatly, is high in cost, and is low in resolution. Thus, the need for improvement still exists.

A display (e.g., LCD (liquid crystal display)) is a requisite component of a typical laptop. This, however, can increase the manufacturing cost. Thus, it is desirable of providing a laptop having a screen as a replacement of display without compromising image quality shown on the screen.

SUMMARY OF THE INVENTION

It is therefore one object of the invention to provide a laptop comprising a housing; a keyboard mounted on the housing; a rectangular frame element pivotably secured to a front end of the housing and being adapted to open or close onto the keyboard; a screen enclosed by the frame element; an inverted U-shaped frame member pivotably secured to front corners of the housing and being adapted to open or close onto the frame element; a micro-projector pivotably mounted on a transverse part of the frame member; and a camera pivotably mounted on the transverse part of the frame member besides the micro-projector.

The above and other objects, features and advantages of the invention will become apparent from the following detailed description taken with the accompanying drawings.

DETAILED DESCRIPTION OF THE INVENTION

Figure 1:
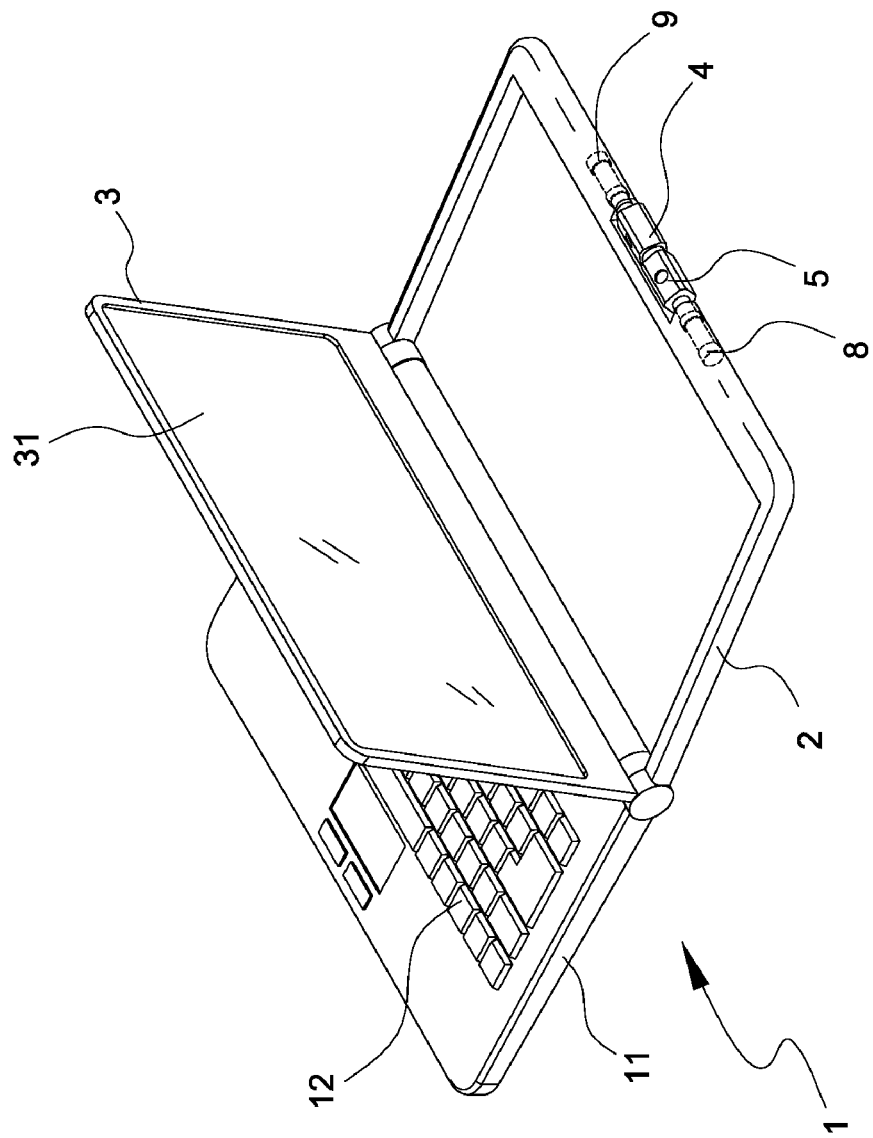
FIG. 1 is a perspective view of a laptop according to the invention being open.

Referring to FIGS. 1 to 6, a laptop 1 in accordance with the invention comprises the following components as discussed in detail below.

A housing 11 is provided with a keyboard 12 mounted thereon. A rectangular frame element 3 is pivotably secured to a front end of the housing 11. A screen 31 is enclosed by the frame element 3. An inverted U-shaped frame member 2 is pivotably secured to front corners of the housing 11. The frame element 3 is adapted to open or close onto the keyboard 12 in an inoperative position. The frame member 2 is also adapted to open or close onto the frame element 3 in the inoperative position in a manner known in the art.

A micro-projector 4 is pivotably mounted on a transverse part of the frame member 2 by means of a pivot axis 9. Hence, the micro-projector 4 is adapted to adjust its projection angle. A camera (e.g., digital camera) 5 is pivotably mounted on the transverse part of the frame member 2 besides the micro-projector 4 by means of the pivot axis 8. Hence, the camera 5 is adapted to adjust its picture taking angle.

The micro-projector 4 is implemented as one employing LED (light emitting diode) based DLP (digital light processing), LCOS (liquid crystal on silicon), or laser based projection technology. Components (e.g., motherboard, keyboard, touchpad, hard disk, DVD, etc.) of the laptop 1 are known in the art. Therefore, their description is omitted herein for the sake of brevity. The micro-projector 4, the camera 5, and the screen 31 are subjects of the invention which will be described in detail below.

Figure 5:
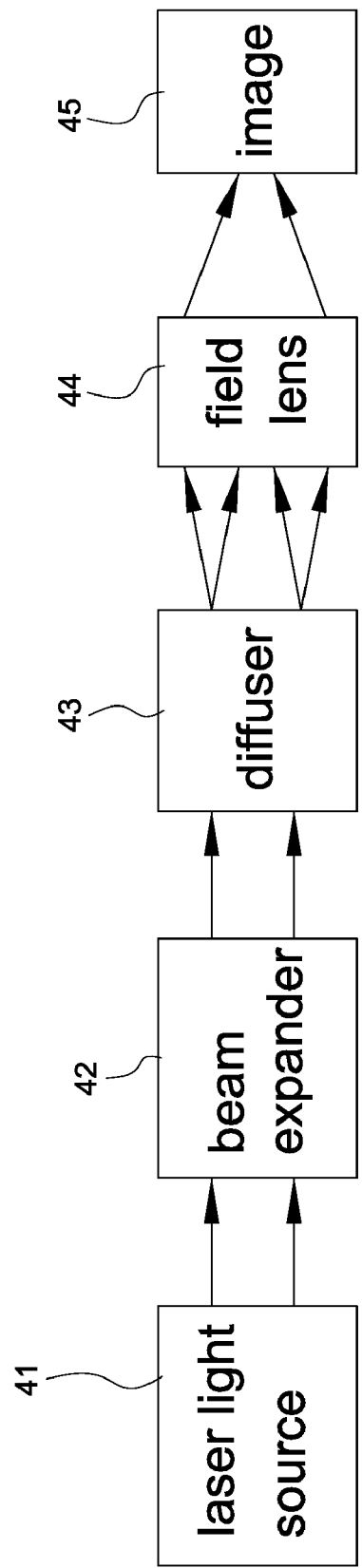
FIG. 5 is a block diagram of the micro-projector.

As shown in FIG. 5, the micro-projector 4 comprises a laser light source 41 for emitting highly collimated laser light, a beam expander 42 for expanding the diameter of the collimated laser light, a diffuser 43 for transforming the collimated laser light into light cones, and a field lens 44 for focusing the light cones into an image 45. The micro-projector 4 has the advantages of less light loss, quality image, and high brightness.

As shown in FIG. 1, the screen 31 is served as a replacement of the typical LCD display of a laptop. In one use mode, what shown on the typical LCD display can be shown on the screen 31 by projecting through the micro-projector 4. Also, the micro-projector 4 is pivotal. It is envisaged by the invention that quality images can be seen on the screen 31 by adjusting the projection angle of the micro-projector 4.

Figure 2:
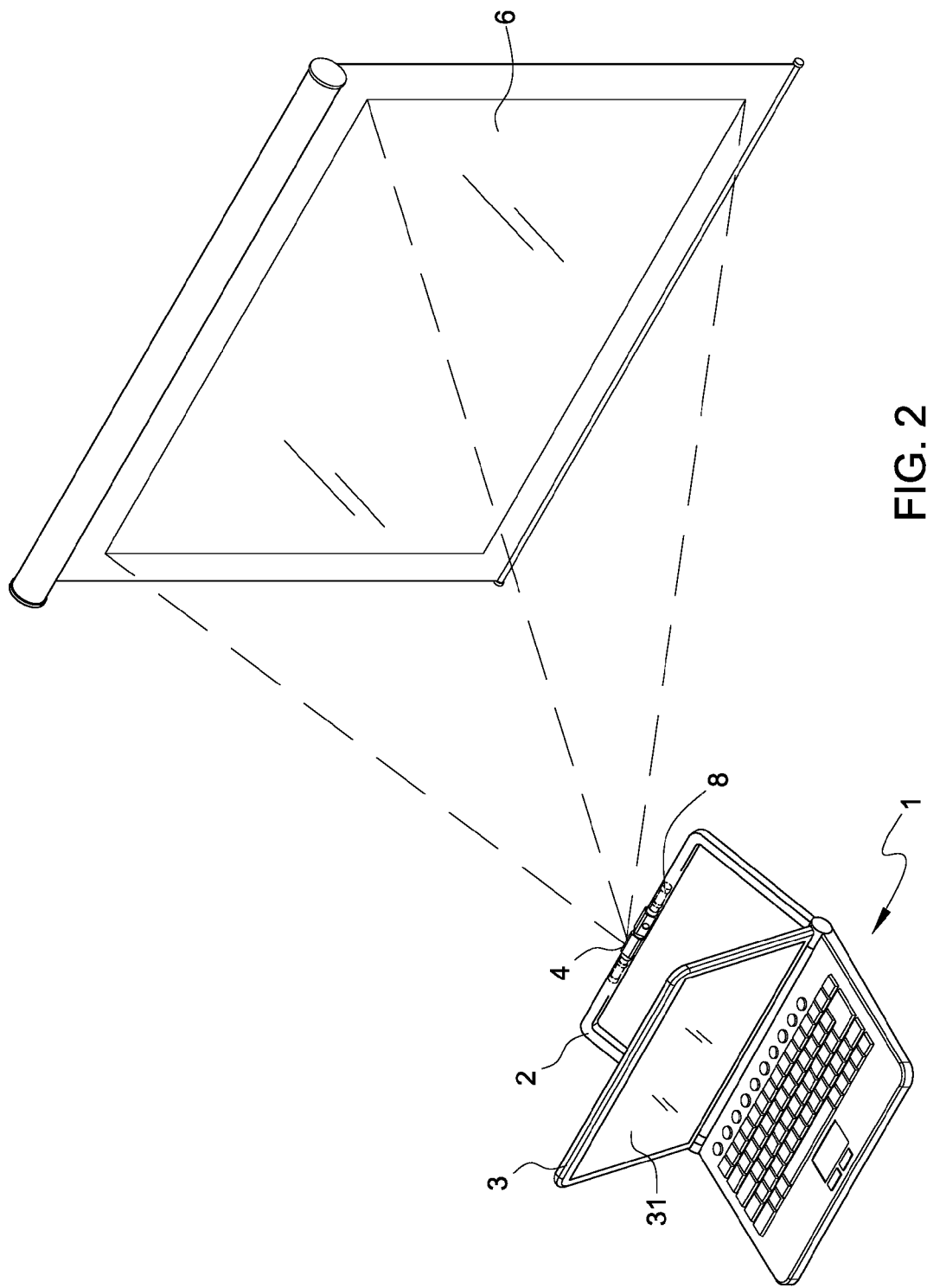
FIG. 2 is a perspective view showing an operation of the micro-projector.

As shown in FIG. 2, in another use mode such as in a meeting or briefing, a user may pivot the frame member 2 and adjust the angle of the micro-projector 4 in order to project what shown on the screen 31 onto a screen 6 hanged on a wall. It is envisaged by the invention that quality images can be seen on the screen 6.

Regarding DLP (as implemented by one embodiment of the micro-projector 4), it is a technology developed by Texas Instruments for being used in TVs and video projectors. In DLP projectors, the image is created by microscopically small mirrors laid out in a matrix on a semiconductor chip, known as a Digital Micromirror Device (DMD). Each mirror represents one or more pixels in the projected image. The number of mirrors corresponds to the resolution of the projected image (often half as many mirrors as the advertised resolution due to wobulation). 800×600, 1024×768, 1280×720, and 1920×1080 (HDTV) matrices are some common DMD sizes. These mirrors can be repositioned rapidly to reflect light either through the lens or on to a heat sink. Rapidly toggling the mirror between these two orientations (essentially on and off) produces grayscales, controlled by the ratio of on-time to off-time. In detail, the mirrors can be individually rotated +10 degree to an on state or −10 degree to an off state. In the on state, light from the projector bulb is reflected into the lens making the pixel appear bright on the screen. In the off state, the light is directed elsewhere (usually onto a heat sink), making the pixel appear dark.

For DLP based projectors and TVs, they have the following advantages: Smooth, jitter-free images. Perfect geometry and excellent grayscale linearity achievable. Great ANSI contrast. No possibility of screen burn-in. Less "screen-door effect" than with LCD projectors. DLP rear projection TVs generally have a smaller form factor than comparable CRT projectors. The use of a replaceable light source means a potentially longer life than CRTs and plasma displays. Lighter weight than LCD and plasma televisions. Strong color performance. DLP projectors do not suffer from "Color Decay" often seen with LCD projectors in which the image on the screen turns yellow after extended periods of usage.

Regarding LCOS (as implemented by another embodiment of the micro-projector 4), it is a "micro-projection" or "micro-display" technology typically applied in projection televisions. It is a reflective technology similar to DLP projectors; however, it uses liquid crystals instead of individual mirrors. By way of comparison, LCD projectors use transmissive LCD chips, allowing light to pass through the liquid crystal. In LCOS, liquid crystals are applied directly to the surface of a silicon chip coated with an aluminized layer, with some type of passivation layer, which is highly reflective.

There are two broad categories of LCOS displays: three-panel and single-panel. In three-panel designs in a DLP device the light is separated into three components and then combined back: Two polarization beam splitters (PBSs) are needed. In LCOS devices the light is additionally polarized and then analyzed; four beam splitters are needed. In most DLP sets a color wheel separates colors from a lamp, using one chip for all three colors; SXRD sets use three separate chips, one for each color.

Figure 6:
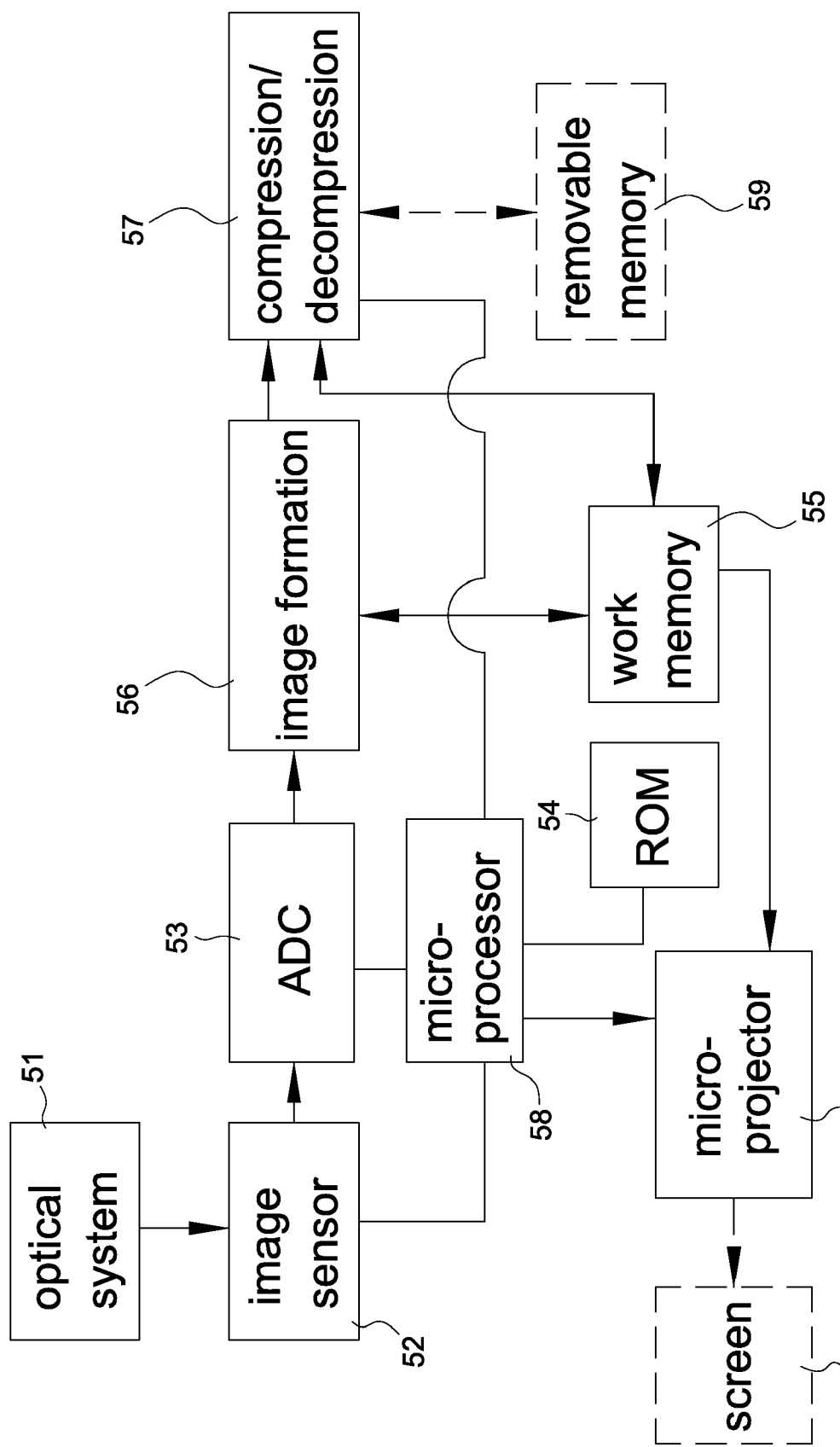
FIG. 6 is a block diagram of the camera.

As shown in FIG. 6, the camera 5 comprises an optical system 51 for taking pictures, an image sensor 52 for sensing pictures taken by the optical system 51, an ADC (analog to digital converter) 53 for converting analog signals of the pictures into digital signals, an image formation 56 for transforming the digital signals into images, a ROM (read-only memory) 54 for storing software programs required for activating the camera 5, a work memory 55 for temporarily storing the images, a compression/decompression 57 for compressing or decompressing the images so as to be further stored in a removable memory (e.g., USB stick) 59, and a microprocessor 58 electrically connected to the image sensor 52, the ADC 53, the compression/decompression 57, and the ROM 54 for controlling their operations. Further, the microprocessor 58 may instruct the compression/decompression 57 to send the images stored in the work memory 55 to the micro-projector 4 which in turn projects same on the screen 31.

Figure 3:
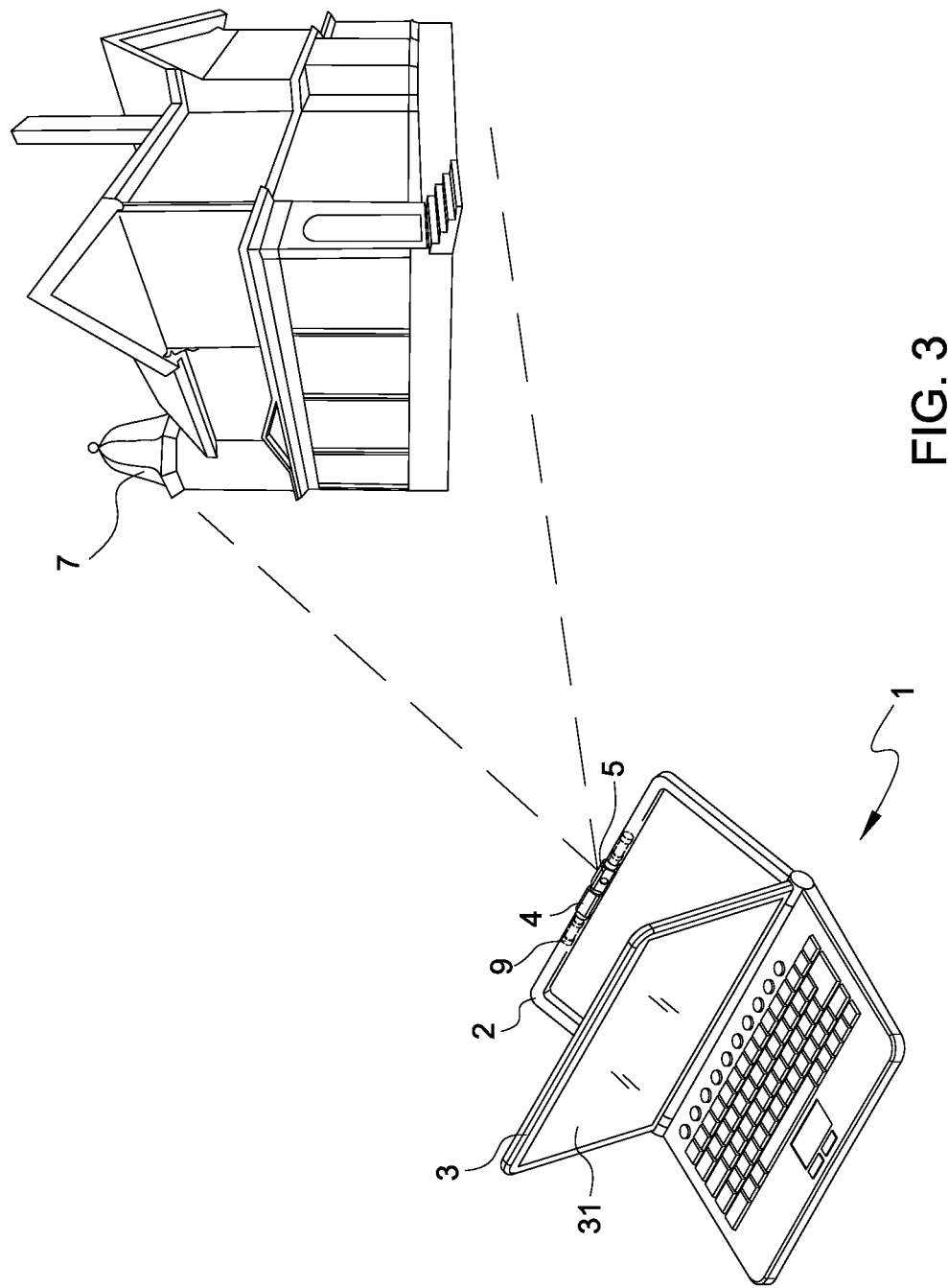
FIG. 3 is a perspective view showing an operation of the camera.
Figure 4:
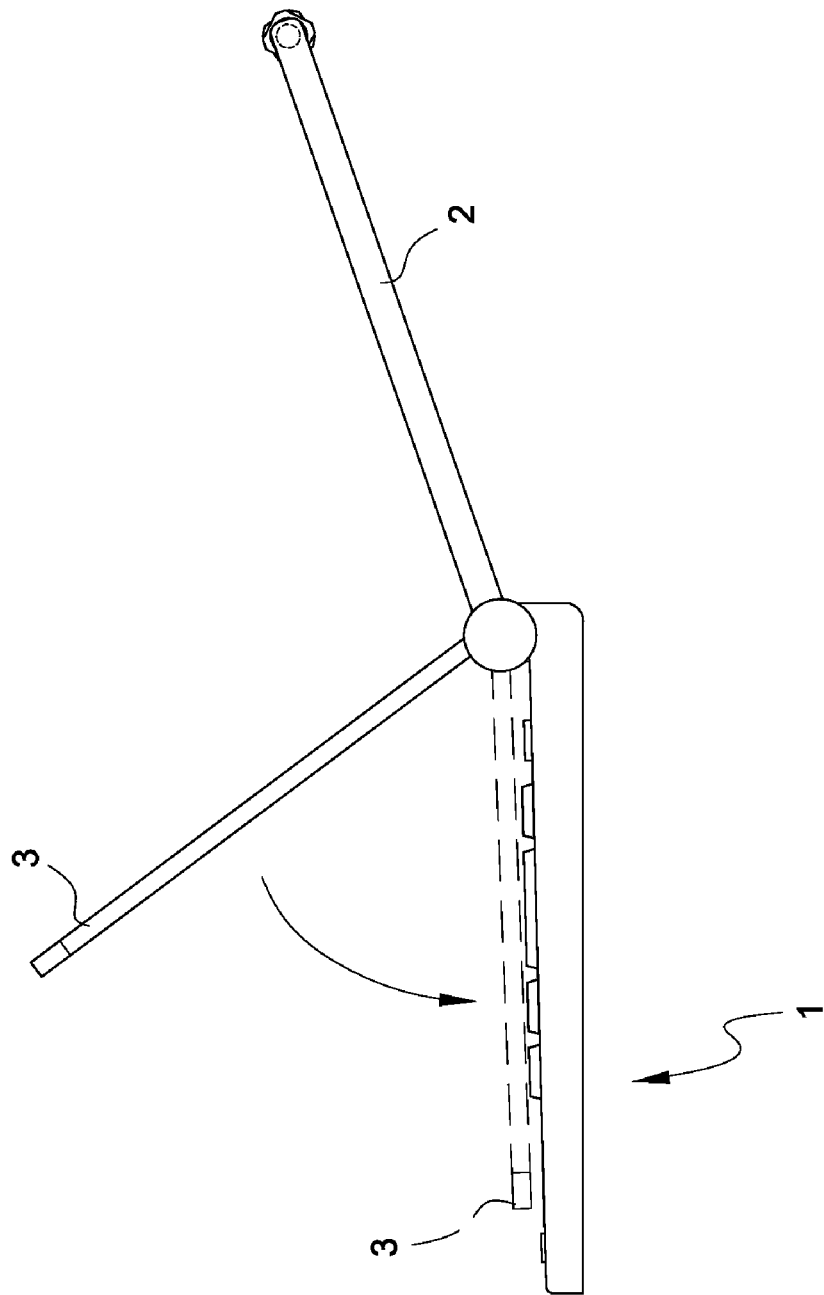
FIG. 4 is a side elevation of the laptop showing a pivotal operation of the screen.

As shown in FIG. 3, for taking a picture a user may operate the laptop 1 and the camera 5 (i.e., the optical system 51 as instructed by the microprocessor 58) to take a picture of an object 7. The taken picture is then sent to the ADC 53 to convert analog signals of the pictures into digital signals. Next, the image formation 56 transforms the digital signals into images. The work memory 55 may temporarily store the images. The compression/decompression 57 may compress or decompress the images sent from the image formation 56 and/or the work memory 55 so as to be further sent to the micro-projector 4 via the work memory 55. Finally, the micro-projector 4 may project the images on the screen 31. It is noted that both the micro-projector 4 and the camera 5 are activated in the picture taking mode.

The invention has the following advantages: More options are provided for user selection. Compactness. Less power consumption. Quality images.

While the invention herein disclosed has been described by means of specific embodiments, numerous modifications and variations could be made thereto by those skilled in the art without departing from the scope and spirit of the invention set forth in the claims.

What is claimed is:

1. A laptop comprising:
   a housing;
   a keyboard mounted on the housing;
   a rectangular frame element pivotably secured to a front end of the housing and being adapted to open or close onto the keyboard;
   a screen enclosed by the frame element;
   an inverted U-shaped frame member pivotably secured to front corners of the housing and being adapted to open or close onto the frame element;
   a micro-projector pivotably mounted on a transverse part of the frame member; and
   a camera pivotably mounted on the transverse part of the frame member besides the micro-projector.

* * * * *